US008714559B2

(12) United States Patent
Hoeting

(10) Patent No.: US 8,714,559 B2
(45) Date of Patent: May 6, 2014

(54) SPINDLE SEAL WITH TANGENTIAL FLOW-INDUCING DISTRIBUTION RING

(75) Inventor: Stephen C. Hoeting, Maineville, OH (US)

(73) Assignee: Setco Sales Company, Cincinnati, OH (US)

( * ) Notice: Subject to any disclaimer, the term of this patent is extended or adjusted under 35 U.S.C. 154(b) by 834 days.

(21) Appl. No.: 12/204,313

(22) Filed: Sep. 4, 2008

(65) Prior Publication Data

US 2010/0052258 A1   Mar. 4, 2010

(51) Int. Cl.
*F16J 15/34* (2006.01)
(52) U.S. Cl.
USPC .......................................... 277/408; 277/400
(58) Field of Classification Search
USPC ............................ 277/400–402, 408, 412, 399
See application file for complete search history.

(56) References Cited

U.S. PATENT DOCUMENTS

| 4,415,166 | A |   | 11/1983 | Beia |  |
|---|---|---|---|---|---|
| 4,792,146 | A | * | 12/1988 | Lebeck et al. | 277/360 |
| 4,973,065 | A |   | 11/1990 | Habich |  |
| 5,522,601 | A |   | 6/1996 | Murphy |  |
| 5,727,095 | A |   | 3/1998 | Hoeting |  |
| 5,980,115 | A |   | 11/1999 | Hoeting |  |
| 6,062,568 | A | * | 5/2000 | Orlowski et al. | 277/348 |
| 6,217,219 | B1 |   | 4/2001 | Hoeting |  |
| 6,367,807 | B1 |   | 4/2002 | Rockwood |  |
| 6,471,215 | B1 |   | 10/2002 | Drago et al. |  |
| 6,485,022 | B1 |   | 11/2002 | Federovich |  |
| 7,090,220 | B2 |   | 8/2006 | Hoeting et al. |  |
| 2005/0051969 | A1 |   | 3/2005 | Hoeting et al. |  |
| 2008/0217861 | A1 | * | 9/2008 | Sei | 277/385 |

FOREIGN PATENT DOCUMENTS

JP    2003120826    4/2003
SU       785578    12/1980

OTHER PUBLICATIONS

Setco, Setco Airshield, Setco Sales Company, Publication S-0006-1, 2003.
Setco, Setco "Universal" AirShield Spindle Seal System, Setco Sales Company, Publication S-0008, 2002.
Effective Sealing of High Seed Rolling Bearings, Dr. Werner Haas, University of Stuttgart, publication date unknown.
International Searching Authority Forms: PCT/ISA/220, PCT/ISA/210, PCT/ISA/237, mailing date of Jan. 14, 2010.

* cited by examiner

*Primary Examiner* — Shane Bomar
*Assistant Examiner* — Kipp Wallace
(74) *Attorney, Agent, or Firm* — Wood, Herron & Evans, LLP

(57) ABSTRACT

A cartridge-type bearing seal includes removably connected stator and rotor sections. The stator section supports a distribution ring that divides an internal annular volume into radially outside and inside portions. The ring has at least one tangentially oriented duct. When pressurized purge fluid is supplied to the outside portion, the fluid flows through the ducts to induce tangential fluid flow within the inside portion, which causes circumferentially uniform fluid pressure in the annular volume adjacent the rotating shaft. The pressurized fluid traverses a flow path along the shaft and eventually out of the bearing housing, to prevent contaminant ingress between the rotating shaft and the bearing housing. This bearing seal eliminates the need to machine a tangentially oriented passage in the bearing housing.

17 Claims, 4 Drawing Sheets

SPINDLE SEAL WITH TANGENTIAL FLOW-INDUCING DISTRIBUTION RING

FIELD OF THE INVENTION

This invention relates to an improved cartridge-type bearing seal for a machine tool spindle.

BACKGROUND OF THE INVENTION

The assignee of the present invention, Setco Sales Company, owns U.S. Pat. Nos. 5,727,095, 5,980,115 and 6,217,219 B1, all of which are entitled "Bearing Seal With Uniform Fluid Purge," and directed to a unique bearing seal which has proved tremendously successful in increasing the reliability of spindles. Setco sells this patented bearing seal under the trademark AIRSHIELD. These Setco patents are incorporated herein by reference, in their entireties.

According to one aspect of the prior invention, as disclosed in the three above-cited patents, the bearing seal includes an annular cap located at a first end of a bearing housing, where a shaft exits therefrom. The cap has an internal surface which defines an annular internal volume, and a passage formed therethrough which tangentially intersects the annular volume. This structure allows pressurized purge fluid to be supplied to the annular volume via the passage, to create a circumferentially uniform fluid pressure within the annular volume. This circumferentially uniform pressure prevents ingress of contaminant materials within the bearing.

This prior invention has significantly increased spindle reliability, by reducing downtime caused by failed bearing seals. Such downtime can have critical adverse effects on overall spindle efficiency and throughput.

These prior patents disclose several embodiments for achieving the critical benefits of this prior invention. Moreover, these prior patents expressly suggest that the benefits of that prior invention can be obtained in retrofit situations, where an in-place spindle with a failed bearing seal requires the retrofitting of a new bearing seal. These prior patents suggested some general details of how such a retrofitted bearing seal could be achieved. However, those prior patents did not disclose or suggest a specific structure for achieving the benefits of the prior invention with a wide variety of spindles of various size and shape.

For these reasons, Setco developed a second generation version of this type of bearing seal, i.e. a bearing seal with circumferentially uniform fluid pressure, which achieved certain advantages by using an annular cartridge having connectable stator and rotor sections. This second generation bearing seal was the subject of Setco's U.S. Pat. No. 7,090,220, entitled "Cartridge-Type Bearing Seal For Machine Tool Spindle," which is expressly incorporated by reference herein, in its entirety. This cartridge type bearing seal facilitated the retrofitting of bearing seals on in-place spindles, readily accommodated various sizes and shapes of spindles, and did so in a simple and cost-effective manner. This second generation bearing seal also increased the availability, for a wide range of bearing seals, of the uniform air purge feature that was achieved with the original invention.

SUMMARY OF THE INVENTION

It is an object of the present invention to still further increase the availability, for various bearing seals, of the uniform air purge feature of the original invention, and to do so in a relatively cost-effective manner.

The present invention achieves these objectives by modifying the prior annular cartridge to include a distribution ring that induces tangential flow of pressurized purge fluid, to cause circumferentially uniform fluid pressure. By equipping the removable cartridge with the structure that causes this tangential flow, and hence the circumferentially uniform fluid pressure, the present invention eliminates the prior need to drill a tangentially oriented hole in the bearing cap. Such holes can be difficult to drill.

With the present invention, rather than drilling a tangentially oriented hole in the bearing cap, the user needs only to drill a radially oriented hole. When pressurized purge fluid is supplied to the hole and directed into an internal annular volume that surrounds the shaft, the distribution ring induces the desired tangential flow. This tangential flow, and the resultant circumferentially uniform fluid pressure, continues along a fluid flow path that traverses the annular space between the rotor and stator sections of the cartridge, and eventually out of the cartridge. This is similar to the original invention.

According to one preferred embodiment of the invention, an annular cartridge includes two removably connected sections, a stator section and a rotor section, and a distribution ring located on the inboard side of the stator section. The distribution ring is located adjacent an internal passage formed in the bearing housing, through which pressurized purge fluid is received. At the location where the distribution ring occupies the internal annular volume, the ring defines inside and outside portions of the annular volume. The distribution ring includes at least one, and preferably four, substantially tangentially oriented slots, or ducts. Each of the ducts provides a fluid connection from the outside portion to the inside portion so that pressurized purge fluid can flow therethrough. Each duct is curved along its length, with an outer section oriented generally radially and an internal section oriented substantially tangential to the axis. The number, sizing and spacing of the ducts may vary, depending on the dimensions of the particular spindle.

The internal passage that is formed in the bearing housing is preferably located in a bearing cap. The internal passage may be drilled radially into the bearing cap, so as to terminate at the annular volume, and particularly at the outside part of the annular volume that is located radially outside of the distribution ring. Compared to the prior cartridge-type bearing seal, which required a tangentially oriented internal passage, the present structure does not require any particular orientation for the internal passage, so long as it terminates at the outside portion of the internal volume. Tangential drilling is no longer required because this structure incorporates into the cartridge the structure needed, namely, the ducts formed in the distribution ring, to induce the desired tangential flow of pressurized purge fluid. Because the distribution ring induces the desired tangential flow, rather than the internal passage, the internal passage in the bearing housing does not have to be formed via a tangential drilling step, a drilling step that can be difficult to perform.

Additionally, the cartridge cooperates with, and if desired may actually include as an integral component thereof, a secondary ring located adjacent the distribution ring, just inboard thereof. This secondary ring is machined to provide a close gap between its radially internal surface and the rotating shaft. This close gap isolates the internal bearing. By incorporating this isolating structure into the cartridge, or at least by not requiring the bearing cap to have the isolating structure, this aspect of the invention eliminates the need to machine the bearing cap to a tight tolerance to provide this close gap. This secondary ring is a smaller component that is relatively easy to machine compared to the bearing cap. Thus, this secondary ring facilitates the setting of this clearance gap. Also, the secondary ring helps to affirmatively fix the distribution ring at the desired axial position.

With this invention applicant has moved the tangential flow-inducing structure into the cartridge itself, to eliminate the need to drill a tangentially oriented passage in the bearing housing. Several other advantages flow from this structural change.

These and other features of the invention will be more readily understood in the context of the following drawings and the detailed description.

DETAILED DESCRIPTION OF THE INVENTION

Figure 1:
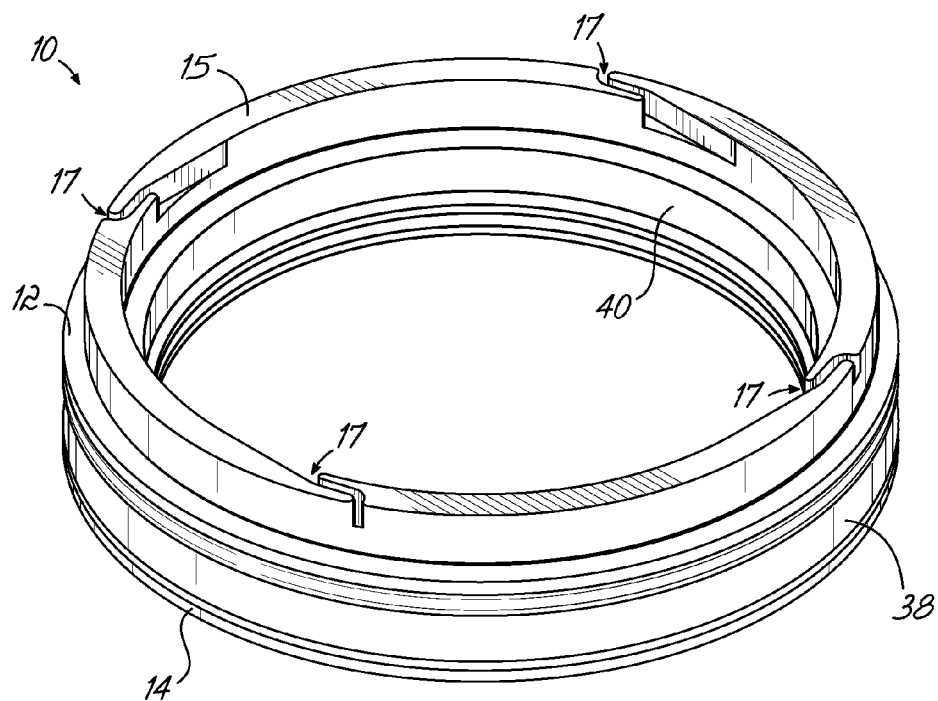
FIG. 1 is a perspective view of a cartridge-type bearing seal constructed according to a first preferred embodiment of the invention.

FIG. 1 shows a cartridge-type bearing seal constructed in accordance with a first preferred embodiment of the invention. The cartridge-type bearing seal of this invention makes the inventive bearing seal of Setco's prior patents more readily available to a wider variety of spindle structures. And this inventive cartridge bearing seal is particularly suitable for retrofitting in-place spindles.

Figure 2:
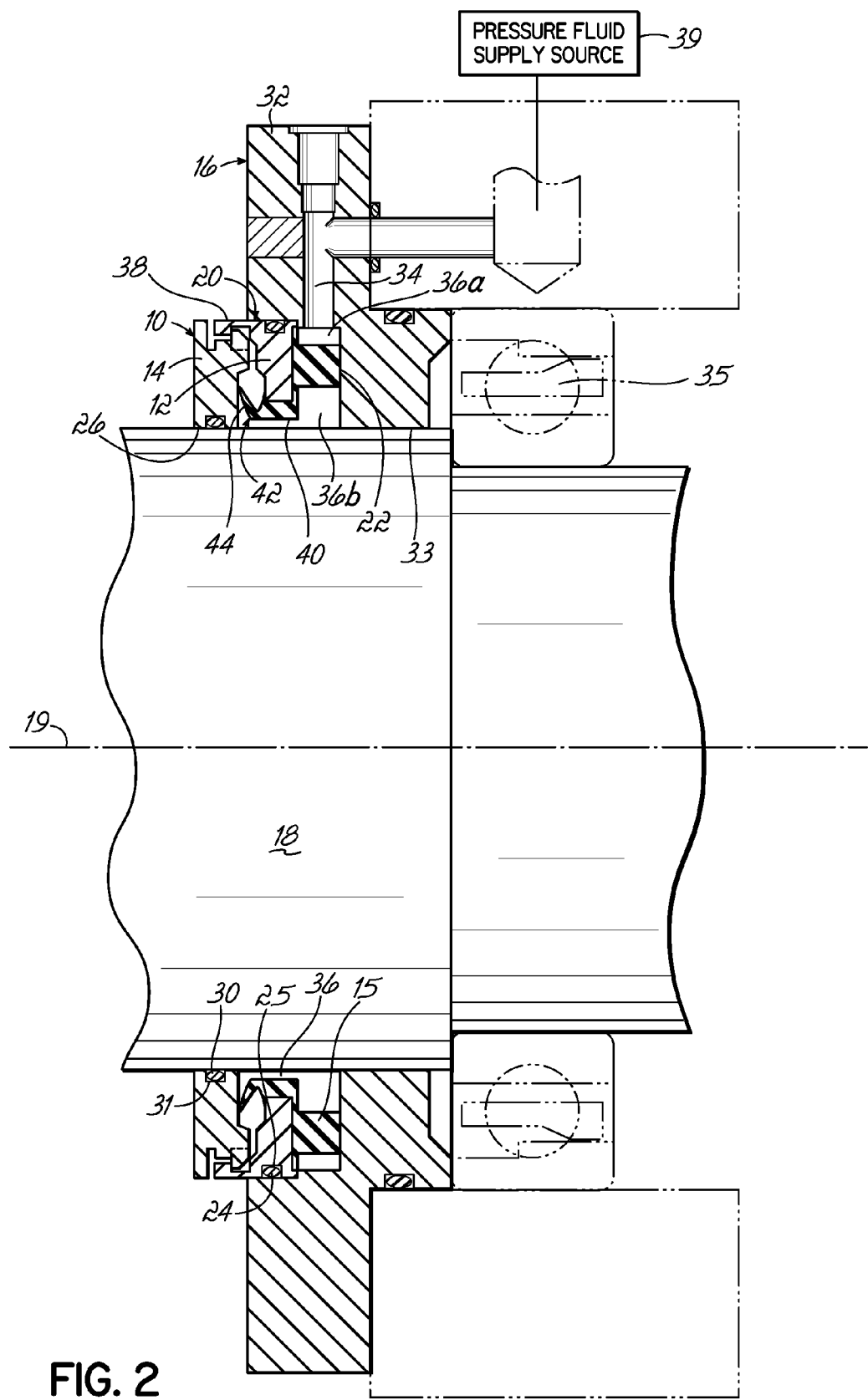
FIG. 2 is a longitudinal cross sectional view of the cartridge-type bearing seal of FIG. 1, but mounted on a spindle.

FIG. 1 shows that the bearing seal of this invention comprises an annular cartridge 10 with interconnected first and second sections 12 and 14, respectively. The first section 12 is a stator section, and it is fixedly mounted to a stator 16 (FIG. 2), while second section 14 is a rotor section which is fixedly mounted to a rotor 18 (FIG. 2). A distribution ring 15 is located adjacent the first section 12, and preferably formed of rubber and adhered to the first section 12, to essentially become a part thereof. The distribution ring 15 includes a plurality of substantially tangentially oriented ducts 17. In this context, substantially tangentially oriented also includes a purely tangential orientation.

FIG. 2 shows that the rotor 18 is rotatable relative to the stator 16, about an axis 19 when driven by a drive motor (not shown). The stator section 12 is piloted into a circular recess formed within stator 16, and which is defined by an axially oriented surface 20 and a radially oriented surface 22, which are parallel to and perpendicular to axis 19, respectively. An O-ring 24 resides within a recess 25 formed within an exterior surface of the stator section 12. The surfaces 20 and 22 form part of the stator 16 located at one end of a stator housing. When the first section 12 is mounted in place on the stator 16, in a press fit condition, the first section 12 remains fixed relative to the axis 19. That is, the first section 12 effectively becomes part of the stator 16. In the context of this application, the terms rotor and stator are generally used interchangeably with the terms shaft and housing. That is because the rotor 19 rotates, via a shaft, and it rotates relative to a stator, or stationary housing.

The second section 14 mounts to the rotor 18 in such as way that it effectively becomes a part of the rotor 18, because the rotor 18 and the rotor section 14 rotate together about axis 19 during operation. The rotor section 14 may mount to the rotor 18 via any suitable connection or securement, such as, for instance via a press fit along axially directed surface 26 formed along the outer surface of the rotor surface 18, or via a set screw arrangement. An O-ring 30 resides within a recess 31 formed along the radial inner edge of the rotor section 14.

The stator section 12 is rigidly mounted to the stator 16, while the rotor section 14 is rigidly mounted to the rotor 18. At the same time, the stator section 12 and the rotor section 14 are releasably connected to define an annular cartridge 10, in a manner which permits relative rotation of rotor section 14 relative to the stator section 12 about axis 19. The first section 12 and second sections 14 are preferably constructed in a manner which allows a snap fit interconnection of these two components, by applying axially directed force to both of the sections 12, 14 in order to snap them together, as described in the previously mentioned '220 patent.

FIG. 2 also shows an annular end cap 32 which forms part of the structure of the stator 16. Preferably, the end cap 32 is removably connectable to the rest of the stator 16, at the end of the bearing housing, via bolts (not shown). The cap 32 is machined so as to provide a clearance gap between its innermost radial end 33 and the rotor 18, to isolate the internal bearings 35. The end cap 32 includes an internal passage, or passageway 34. This passageway 34 has an internal end that terminates at an internal annular volume 36 which circumferentially surrounds the rotor 18. This annular volume 36 includes a relatively large annular volume located adjacent the end cap 32, and a relatively thin annular volume located closer to the rotor section 14. From an innermost part of the annular volume 36 (the right side in FIG. 2) to an outermost part (the left side in FIG. 2), within the cartridge 10, the annular volume 36 defines an outbound flow path for pressurized purge fluid. The flow path is annular in shape along its axial length with no non-annular discontinuities along its axial length.

Figure 3:
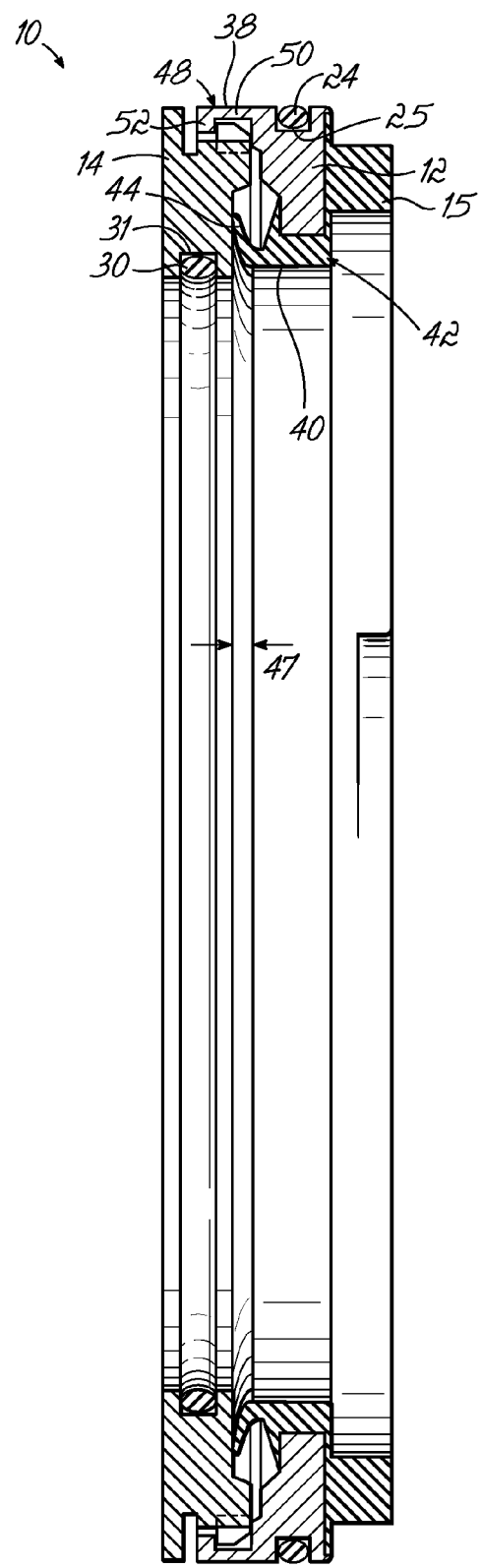
FIG. 3 is an enlarged longitudinal cross-sectional view of the cartridge-type bearing seal shown in FIG. 1.

FIG. 3 shows that the cartridge 10 generally has an outer or exterior surface 38 and an inner or interior surface 40. The interior surface 40 is located adjacent to and forms an outer boundary for the internal annular volume 36. Just radially outside of the annular volume 36, the cartridge 10 includes a seal 42 affixed to the stator section 12, of the type disclosed in the prior patents cited above. The circumferential seal 42 includes a circumferential lip 44 which engages the rotor section 14 when the rotor 18 is not rotating relative to the stator 16. When the rotor 18 is rotating relative to stator 16 about axis 19, and with pressurized purge fluid supplied to the annular volume 36, the lip 44 flexes away from the rotor section 14 to allow purge fluid to flow radially outwardly, in a circumferentially uniform manner, along a path defined by the open space between the stator section 12 and rotor section 14. Reference numeral 47 generally designates the axial distance between the stator section 12 and the rotor section 14, when these two sections are snap fitted together.

FIG. 3 also shows a circumferential collar 48 extending around the exterior of the stator section 12. This collar 48 includes an outer axially extending section 50 and a radially inwardly extending section 52. Preferably, the stator section 12 is made of a relatively flexible material, such as 1018 or 1020 steel. Alternatively, stator section 12 may be made of stainless steel, carbon steel or any other suitable material which is sufficiently durable and sufficiently flexible to achieve the purposes previously described. Preferably, the stator section 14 is made of 4145 hardstock steel, and it is machined to the desired shape via a series of machining steps which may be done on the same machine.

When snap fitted together, the stator and rotor sections 12 and 14 define the outermost part of the fluid flow path At this part of the structure, i.e. radially outside of the lip 44, this fluid flow path traverses an annular space residing between the stator section 12 and the rotor section 14, and eventually beyond the outer surface 38 of the cartridge 10. This flow path is the same as that described in detail in the above-cited '220 patent.

Figure 4:
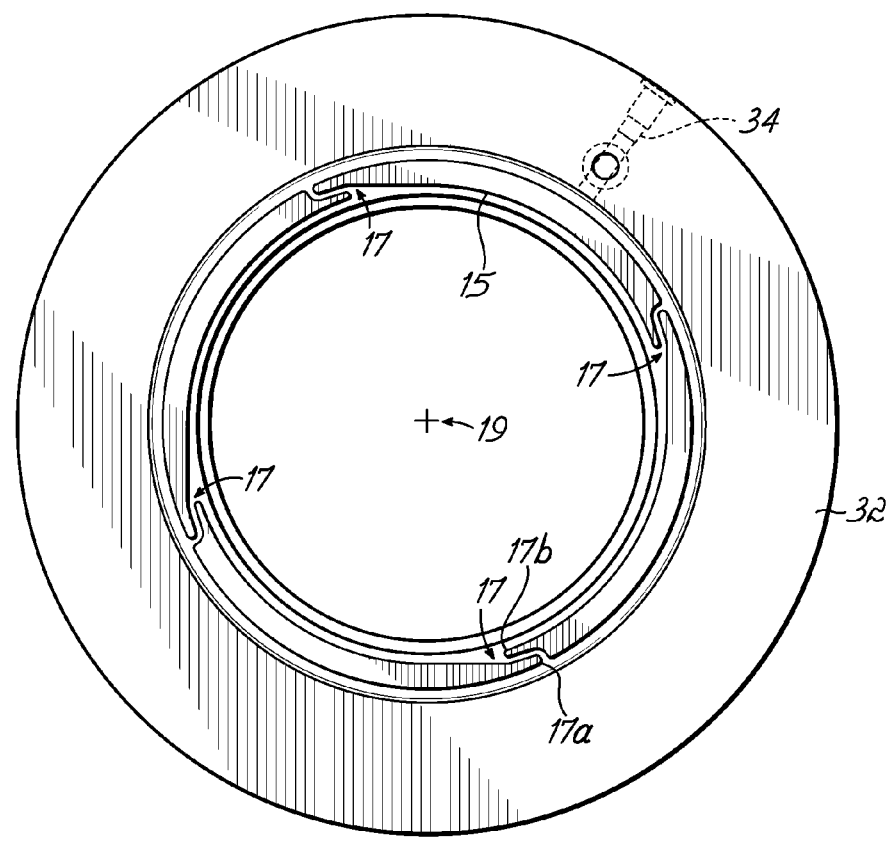
FIG. 4 is a transverse view of the cartridge-type bearing seal of FIG. 1 and a corresponding bearing cap, to show the orientation of the ducts in the distribution ring and the internal passage in the bearing cap.

FIG. 4 shows the locations of the ducts 17 with respect to the axis 19 of the structure. FIG. 4 also shows that each of the ducts 17 has an outer section 17a that is oriented primarily radially, and an inner section 17b that is oriented substantially tangentially. Each duct 17 curves somewhat along its length, to accommodate these two different orientations. FIG. 4 also shows that the internal passage 34, through which pressurized purge fluid is supplied, may be oriented radially with respect to the axis 19. This radial orientation facilitates drilling.

As shown best in FIG. 2, where the internal passageway 34 terminates within the cap 32 the distribution ring 15 defines an outside portion 36a and inside portion 36b of the internal annular volume 36. Nonetheless, the substantially tangentially oriented ducts 17 place the outside portion 36a in fluid communication with the inside portion 36b. Thus, when pressurized purge fluid is supplied from a pressure fluid supply source 39 to the internal passageway 34, it first flows into the outside portion 36a. Thereafter, the pressurized fluid moves radially inwardly through the ducts 17 of the distribution ring 15, to the inside portion 36b. As this occurs, the ducts 17 cause the pressurized purge fluid to flow tangentially. This induced tangential flow causes circumferential flow within inside portion 36b, and also a circumferentially uniform fluid pressure within the annular volume 36. This circumferentially uniform fluid pressure is maintained as the purge fluid axially traverses the flow path toward an outer surface 38 of the cartridge. The pressure fluid supply source 39 may be any device or structure that creates the desire fluid flow conditions.

For ease in molding the ducts 17 into the ring 15, the ducts 17 are preferably located adjacent the inboard surface of the distribution ring 15. Nonetheless, the ducts 17 could be located anywhere along the axial dimension of the distribution ring 15, or could even extend along the entire axial dimension of the distribution ring 15. The ducts 17 can be made by molding, or by drilling, or any other suitable fashion. The ducts 17 of FIG. 1 have a transverse shape that is rectangular in cross-section, although other transverse cross-sections would also be suitable, such as circular, which would occur if the ducts 17 were formed by drilling.

Figure 5:
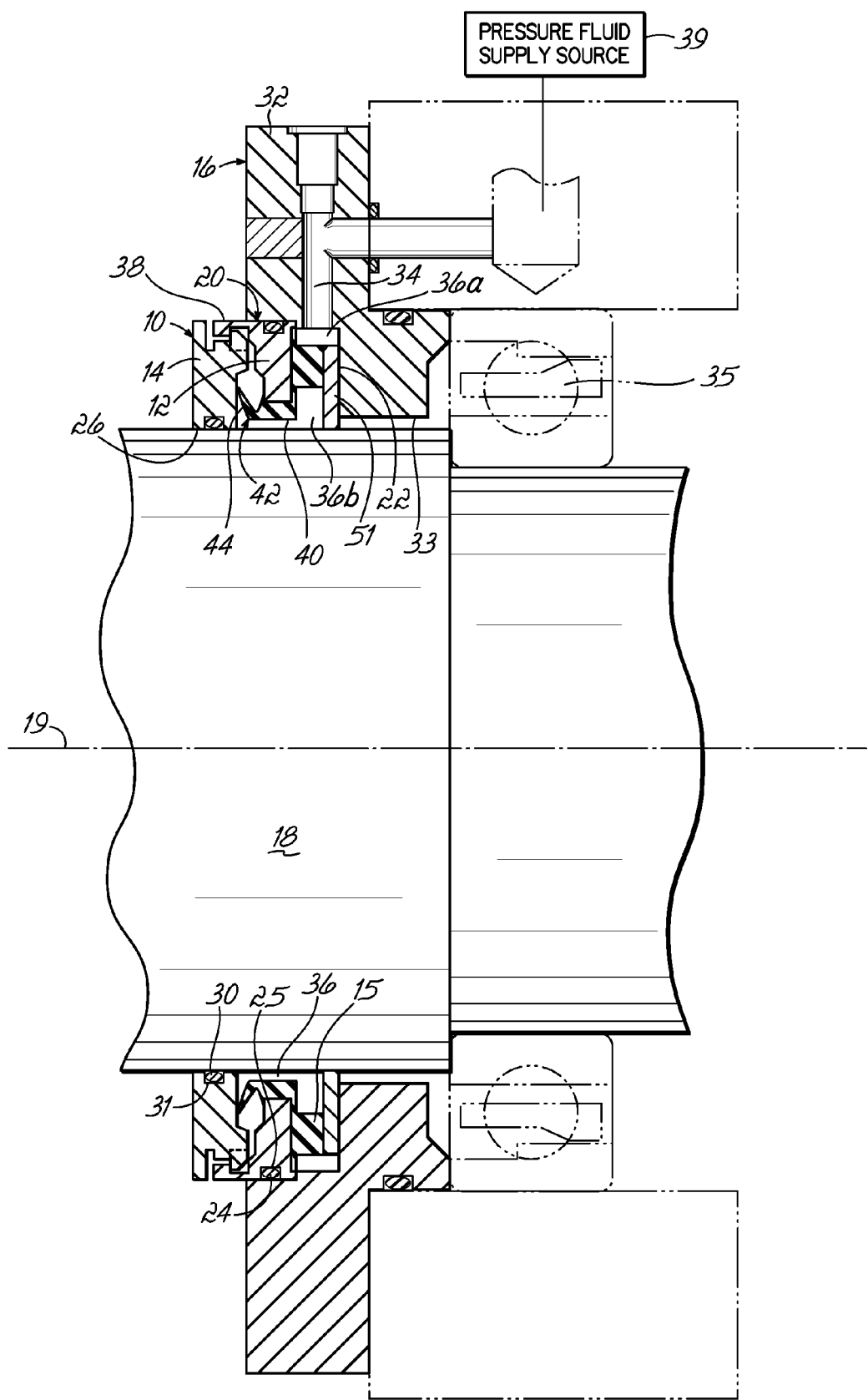
FIG. 5 is a longitudinal cross sectional view, similar to FIG. 2, of a cartridge bearing seal constructed according to a second preferred embodiment of the invention.

FIG. 5 shows a second preferred embodiment of the cartridge-type seal of the this invention. More particularly, this second embodiment uses a secondary ring 51 located adjacent the distribution ring 15. The secondary ring 51 protects the inboard surface of the distribution ring 15. Also, it is sized to extend toward the shaft 18 so as to have a small clearance gap therebetween. With this structure, the secondary ring 51 serves the purpose of providing the needed small clearance gap to isolate the internal bearing 35 of the bearing housing from the seal structure. By using this secondary ring 51 to set this clearance gap and to isolate the internal bearing 35, it is no longer necessary for the radially internal surface 33 of the bearing cap 32 itself to be machined so as to provide this desired close gap. Thus, this embodiment eliminates the need to machine a close clearance between the cap 32 and the shaft 18. Still further, the secondary ring 51 and the distribution ring 15 could be connected together, or even formed as a single piece.

In use, to retrofit an existing spindle which has a failed bearing seal, an operator selects a cartridge 10 of desired shape. This means that the stator section 12 is sized to be fixedly mounted to the stator of the existing spindle 16, while the section 14 is sized to be mounted to the rotor 18. If absolutely necessary, in situations where the stator 16 and the rotor 18 are not a standard size, it would be possible to machine these structures to obtain a desired size and shape to which a stator section 12 and the rotor section 14 of known dimension may be mounted. Alternatively, the stator and rotor sections 12 and 14 can be made to a specific size that is needed. Prior to mounting the stator section 12, the end cap 32 is mounted to an end of the spindle housing. Depending on the circumstances, the end cap 32 and the stator section 12 may be supplied separately, or together, to facilitate and streamline the sizing of these components. Once the cap 32 has been mounted on the spindle housing, according to a preferred sequence of operation, the cartridge 10 is mounted to the cap 32. This occurs by press fitting the stator section 12 into the recess defined by the surfaces of the cap 32. In this manner, the rotor section 14 remains connected to the stator section 12, so that the cartridge 10 is attached to the cap 32 as a single unit. This connection of the cartridge 10 to the cap 32 may occur either before or after the cap 32 is mounted to the end of the spindle housing, depending upon the particular circumstances.

The rotor 18 is then moved in an axial direction, preferably toward the spindle housing, to press fit the rotor section 14 onto the rotor 18. To achieve a desired axially position of the rotor section 14 relative to the stator section 12, shims (not shown) are temporarily located in the outer radial end of the fluid flow passage. The rotor 18 is slowly rotated relative to the spindle housing and the shims are successively inserted or removed in order to orient the rotor section 14 in a desired position relative to the stator section 12, and preferably in a manner which is circumferentially uniform about the spindle axis 19. In the desired position, via this process, the stator section 12 and the rotor section 14 will be axially spaced away from each other during operation so that there is no surface to surface contact during rotation of the rotor 18. Preferably, when the sections 12 and 14 of the cartridge 10 are connected via a snap fit, there is some amount of axial play, or axial tolerance. But when mounted, that play essentially becomes a clearance between the collar 48 and the rotor section 14. Applicant has learned that an axial play dimension of about 0.5 mm has proved suitable for most purposes, although this dimension may vary depending upon the circumstances.

A fluid pressure source 39 is operatively connected to the end cap 32, to supply pressurized purge fluid to the passageway 34 which terminates at the outside portion 36a of the annular volume 36. The substantially tangentially oriented ducts 17 induce tangential flow as the purge fluid moves to the inside portion 36b. This generates circumferentially uniform flow of purge fluid in the annular volume 36, and also circumferentially uniform fluid pressure, which is maintained as the purge fluid first flows axially along the shaft 18, and then flows radially outwardly from the cartridge 10 via the space which resides between the two interconnected sections 12 and 14. This flow path traverses the lip 44, which flexes away from the rotor section 14 during rotation of the rotor 18 relative to the stator 16, when pressurized purge fluid is applied to the volume 36. Eventually, the purge fluid moves beyond the outer surface 38 of the cartridge 10.

Applicant previously learned that the supplying of circumferentially uniform purge fluid to the annular volume surrounding a rotating shaft could be used to achieve significant advantages in preventing contaminant ingress into the bearing seals of a spindle. The details and embodiments of that prior invention are described and shown in the four U.S. patents described above. With this invention the applicant has achieved another advance in applying the prior invention to a broader range of spindles, and has done so in a cost-effective manner.

Thus, while embodiments of the invention has been described, it will be readily apparent to one of skill in the art that variations in these embodiments may be made without departing from the principles of the invention, the scope of which is defined by the appended claims.

I claim:

1. A bearing seal for preventing contaminant ingress between a rotatable shaft and a bearing housing which supports the shaft for rotation about an axis, comprising:
   an annular cap located at a first end of the bearing housing where the shaft exits therefrom, the cap having an outer surface and a radial internal surface spaced from the shaft, the cap also having a passage formed therethrough which extends from the radial internal surface to the outer surface, wherein the passage is oriented substantially radially to the axis, the cap defining an annular volume residing between the radial internal surface and the shaft; and
   a distribution ring removably residing in the annular volume of the cap and defining inside and outside portions of the annular volume, the distribution ring having at least one substantially tangentially oriented duct formed therein that extends between the outside and inside portions of the annular volume, the distribution ring and the annular cap defining an annularly shaped axial flow path that extends axially from the inside portion of the annular volume, the axial flow path including a reduced diameter section located adjacent to the inside portion of the annular volume whereby upon supplying pressurized purge fluid through the passage to the outside portion of the annular volume, the at least one substantially tangentially oriented duct induces a tangential flow in the purge fluid as the purge fluid moves from the outside portion to the inside portion, thereby to create a circumferentially uniform fluid pressure alongside the shaft within the inside portion of the annular volume, so that the pressurized purge fluid traverses the axial flow path and eventually flows outwardly from between the shaft and the bearing housing in a circumferentially uniform manner, wherein the at least one substantially tangentially oriented duct has a first end and a second end and is longitudinally curved along its length therebetween and also has an outer section that is oriented substantially radially and an inner section that is oriented substantially tangentially.

2. The bearing seal of claim 1 wherein the rotatable shaft includes a flange located outside of the bearing housing, the flange spaced from the cap with a generally ring-shaped volume residing therebetween, and further comprising:
   the annular cap including a recess formed in an outer surface thereof directed axially away from the bearing housing and opposite the flange; and
   a seal residing within the recess in the annular cap, the seal including a flexible lip extending toward and circumferentially engaging the flange to circumferentially close off the annular volume at one axial end thereof.

3. The bearing seal of claim 1 wherein the distribution ring is elastomeric.

4. A method for maintaining a seal between a rotatable shaft and a housing which supports the shaft for rotation about an axis, the housing defining an annular volume circumferentially surrounding a portion of the shaft located inside the housing, the annular volume located adjacent a first end of the housing, the method comprising:
   supplying pressurized purge fluid in a radial direction into the annular volume via a passage formed in the housing, the passage terminating at the annular volume and being radially oriented; and
   causing, with a distribution ring removably residing within the annular volume and defining inside and outside portions of the annular volume, the supplied pressurized purge fluid to be redirected so as to flow in a tangential direction in the inside portion as the purge fluid moves toward the shaft, thereby to generate a circumferentially and substantially uniform purge fluid pressure around the shaft and to produce a substantially circumferentially uniform flow of the purge fluid along an annularly shaped axial flow path that extends axially from the annular volume and includes a reduced diameter section located adjacent the annular volume, so that the purge fluid eventually flows from the annular volume through the reduced diameter section and then outwardly from between the rotatable shaft and the housing and away from the first end of the housing, whereby, the distribution ring comprises at least one substantially tangentially oriented duct formed therein that extends between the outside and inside portions of the annular volume, and during the redirecting so as to flow in a tangential direction, the purge fluid flows through the at least one substantially tangentially oriented duct, and wherein the substantially tangentially oriented duct is curved along its length, with an outer section that is oriented substantially radially and an inner section that is oriented substantially tangentially.

5. The method of claim 4 wherein the passage extends to an outer surface of the housing and is oriented substantially radial from the annular volume to the outer surface.

6. The method of claim 4 wherein the annular volume has a first axial end where the purge fluid flows outwardly therefrom and a second axial end located opposite the first axial end, and the passage communicates with the annular volume near the second axial end.

7. The method of claim 4 wherein a seal resides between the housing and the rotor, in engagement with the housing and the rotor, the seal including a resilient lip which normally contacts one of the housing and the rotor but flexes away therefrom upon sufficient purge fluid pressure build up within the annular volume, thereby to open the annular volume and to cause the outward flow of purge fluid.

8. The method of claim 4 wherein the causing is performed by a distribution ring residing within the annular volume.

9. The method of claim 4 wherein the purge fluid is a gas.

10. A bearing seal for preventing contaminant ingress between a rotatable shaft and a bearing housing which supports the shaft for rotation about an axis, the bearing housing defining an annular volume surrounding the shaft, the bearing housing also having an internal passage formed therein, the internal passage terminating at the annular volume and located adjacent a first end of the bearing housing, comprising:
   an annular cartridge including two interconnected ringlike sections, the annular cartridge including a first section mounted to the first end of the bearing housing and a second section mounted to the rotatable shaft; and a distribution ring located axially adjacent to the first section and which defines inside and outside portions of the annular volume, the distribution ring having at least one substantially tangentially oriented duct that extends between the inside and outside portions, such that pressurized purge fluid supplied to the internal passage flows to the outside portion of the annular volume and then to the inside portion of the annular volume, and in flowing from the outside portion to the inside portion is directed in a tangential direction by the at least one substantially tangentially oriented duct of the distribution ring, so as to flow circumferentially about the shaft within the inside portion, and thereafter to traverse an annularly shaped axial flow path along the shaft to eventually flow radially outwardly between the two interconnected sections and away from the first end of the bearing housing in a circumferentially uniform manner, the annularly shaped axial flow path encircling the shaft and having a reduced diameter section radially inside of the first section; and wherein the at least one substantially tangentially oriented duct is curved along its length, with an outer section that is oriented substantially radially and an inner section that is oriented substantially tangentially.

11. The bearing seal of claim 10 wherein the distribution ring has four ducts.

12. The bearing seal of claim 10 wherein the distribution ring has inboard and outboard axial surfaces and an axial dimension measured therebetween, and each of the ducts is located adjacent the inboard surface and spaced from the outboard surface.

13. The bearing seal of claim 10 further comprising:

a secondary ring located adjacent the distribution ring, the secondary ring contacting the bearing housing and extending radially inwardly toward the shaft to provide a clearance gap therebetween, thereby to isolate the bearing seal from internal components of the bearing housing so as to limit the flow of purge fluid into the bearing housing.

14. The bearing seal of claim 10 wherein the at least one substantially tangentially oriented duct is rectangular in transverse cross section.

15. The bearing seal of claim 10 wherein the distribution ring is radially aligned with the internal passage, where the internal passage terminates.

16. The bearing seal of claim 10 wherein the distribution ring is elastomeric.

17. The bearing seal of claim 16 wherein the distribution ring is part of the first section, and the first section further includes a unitary structural piece which defines the distribution ring and the reduced diameter section of the axial flow path.

* * * * *